United States Patent [19]

Chen

[11] Patent Number: 4,857,897
[45] Date of Patent: Aug. 15, 1989

[54] ELECTRONIC BOILING POINT MUSICAL ALARM

[76] Inventor: Mu H. Chen, No. 47, Lane 58, Wu Ku Wang North Street, San Chung City, Taipei Hsien, Taiwan

[21] Appl. No.: 180,350

[22] Filed: Apr. 11, 1988

[51] Int. Cl.⁴ .............................................. G08B 21/00
[52] U.S. Cl. ...................... 340/692; 99/285; 126/388; 340/595
[58] Field of Search .............. 340/692, 595, 584; 99/285; 126/388

[56] References Cited

U.S. PATENT DOCUMENTS

| | | | |
|---|---|---|---|
| 4,137,832 | 2/1979 | Lambros | 99/285 |
| 4,398,454 | 8/1983 | Lambros et al. | 99/285 |
| 4,735,191 | 4/1988 | Boursse et al. | 126/388 |
| 4,776,296 | 10/1988 | Heermans | 126/388 |

Primary Examiner—Glen R. Swann, III
Attorney, Agent, or Firm—Bernard R. Gans

[57] ABSTRACT

An alarm which can be used in lieu of the knob of the cover of a teapot or an ordinary pot which provides the capability of sounding a musical alarm when the water temperature inside the teapot or kettle nears the boiling point. The alarm contains a body member, an upper plate, a sensor, a speaker and an electronic assembly. The sensor detects the vapor temperature variations in a teapot through a sensing plate beneath the teapot cover and produces an electrical signal corresponding to the vapor temperature level. This signal is then changed to musical sounds through an electronic assembly when the water nears its boiling point.

2 Claims, 5 Drawing Sheets

ELECTRONIC BOILING POINT MUSICAL ALARM

BACKGROUND OF THE INVENTION

The present invention relates to an electronic boiling point musical alarm, and more specifically relates to a device which can be used to replace a cover knob for a teapot so that the user is notified when teapot water reaches boiling point.

Conventionally, whistle-type teapots have a whistle installed on the spout thereof. When the vapor pressure inside the teapot reaches a certain level, the whistle will blow thus reminding the user that the water is boiling. However, such a teapot has the following drawbacks:
1. The sound produced by the whistle is monotonous and noisy.
2. Due to the fact that the vapor pressure within the teapot has to reach a certain level before the whistle can blow, the time when the whistle begins to whistle is not the exact time at which the water starts boiling.
3. It is not feasible to convert an ordinary teapot into a whistle-type teapot.

SUMMARY OF THE PRESENT INVENTION

An objective of this invention is to provide an electronic boiling point music alarm which uses a sensing plate to sense the vapor temperature of teapot water.

Another objective of this invention is to provide an electronic boiling point musical alarm which has a music-generating IC and some amplifying circuits installed thereon so that when the teapot water reaches the boiling point, the alarm will musically sound.

Other merits of the invention will become apparent as the following description proceeds.

DETAILED DESCRIPTION OF THE PREFERRED EMBODIMENT

Figure 1:
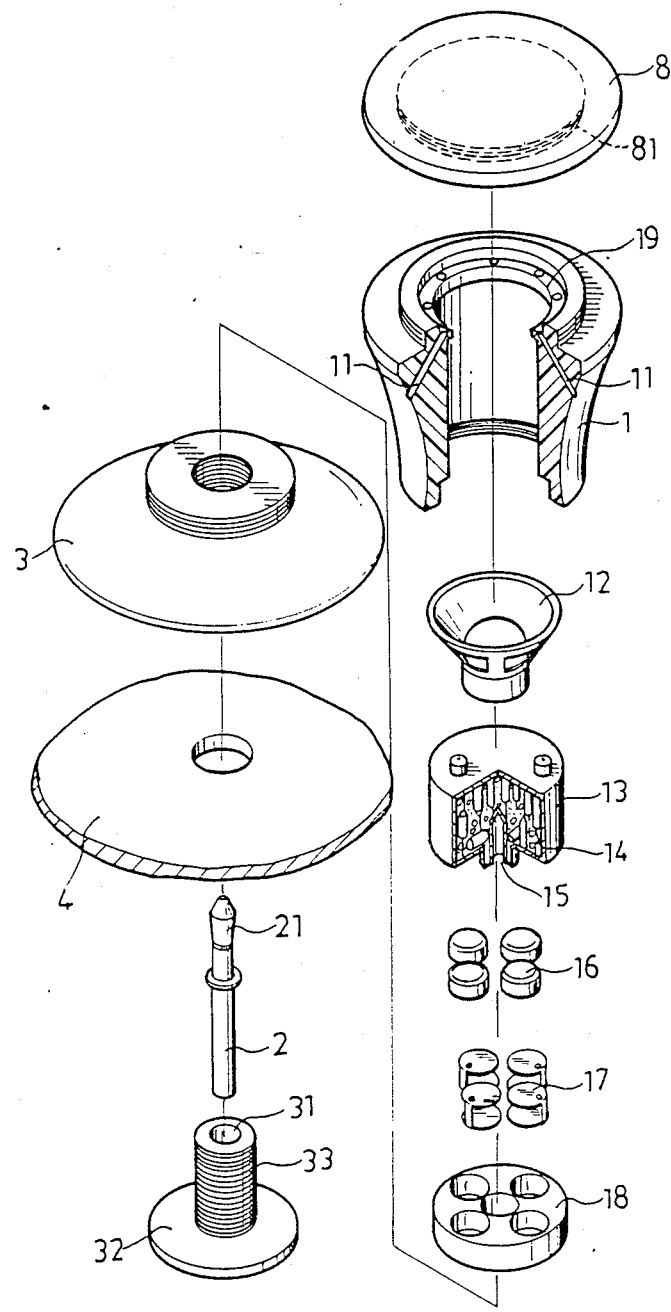
FIG. 1 is an exploded view of an electronic boiling point musical alarm in accordance with the present invention.
Figure 2:
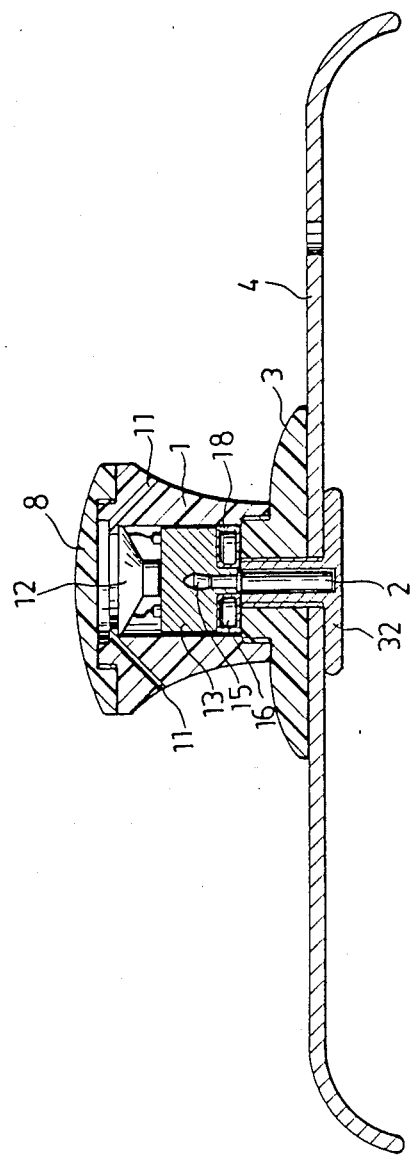
FIG. 2 is a cross-sectional view of the electronic boiling point musical alarm of FIG. 1.

Referring to FIG. 1 and 2, it can be seen that the electronic boiling point musical alarm of the present invention comprises an upper plate 8 with a cavity 81 set therein which is threadably fixed with a body member 1. The emitting end of a speaker 12 is facing against the cavity 81 thereby producing sound resonance effects. A frusta-conical channel 11 is provided in the body member 1, which not only provides a passage for the voice of the speaker 12 to propagate through but also prevents the speaker from possible damage caused by the accumulation of the vapor thereon. An encasement 13 is provided for encasing electronic assembly 14. A holder 18 is provided for cooperating with a plurality of fixing seats 17 so as to accommodate a plurality of mercury cells 16 therein and form a power supply. A seat 3 is threadably attached to the bottom of the body member 1. Reference numeral 4 represents the part of a teapot cover on which a sensing plate 32 and a seat 3 are threadably fixed. A sensor 2 is disposed within an inner hole 31 of the threaded portion of sensing plate 32 with its head 21 received in a receptacle 15 at the encasement 13.

Figure 3:
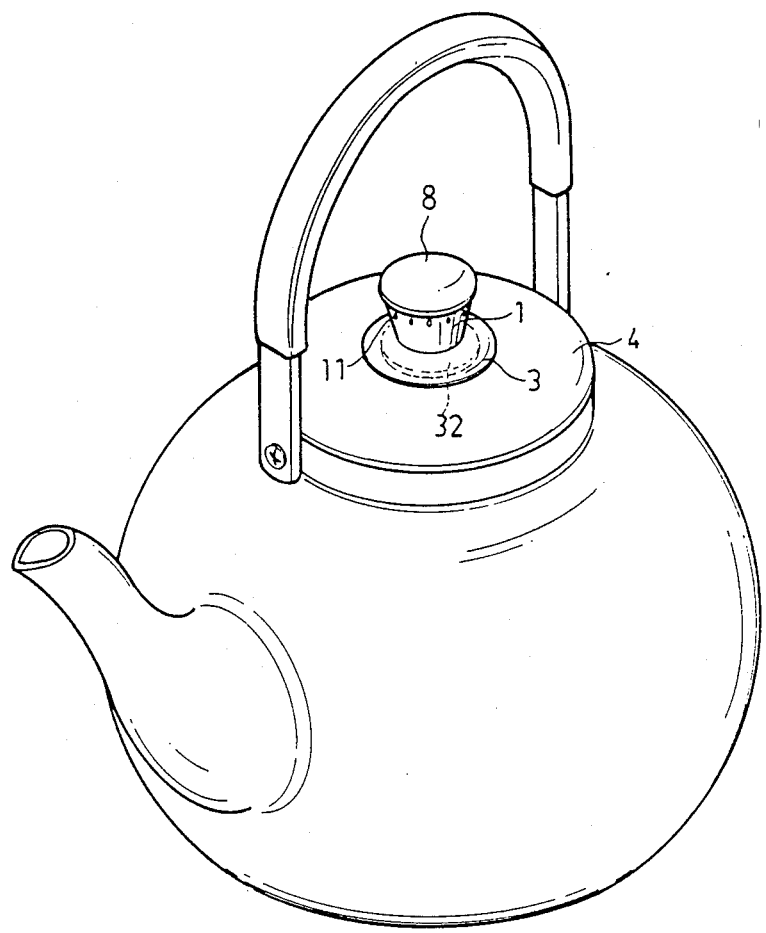
FIG. 3 shows a working application of an electronic boiling point musical alarm in accordance with the present invention on a teapot.
Figure 4:
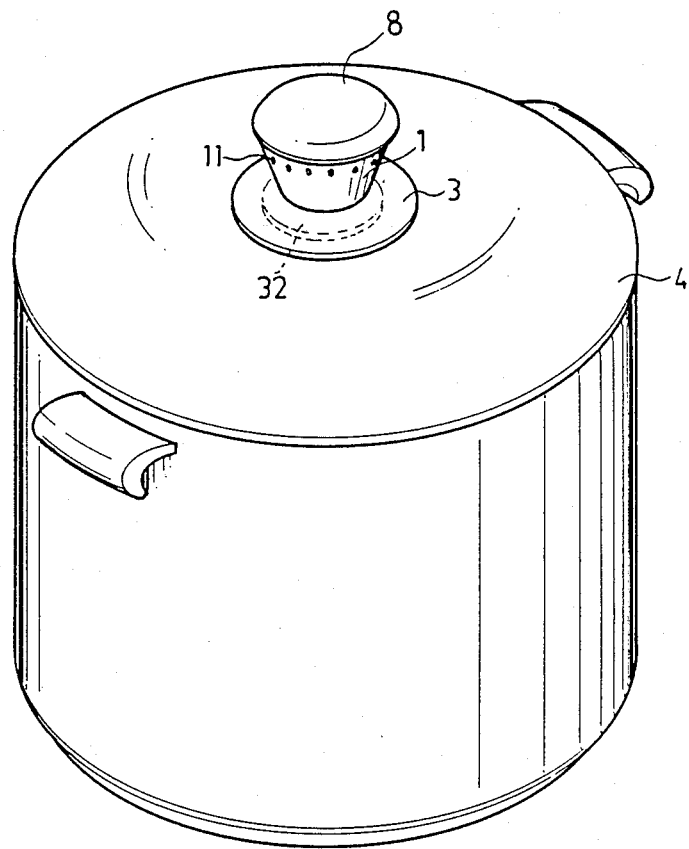
FIG. 4 shows another working application of an electrical boiling point musical alarm in accordance with present invention on an ordinary pot.

Further referring to FIGS. 2, 3 and 4, the interrelationship between the electronic boiling point alarm of the present invention and a teapot or the like can be seen. The sensor 2 is located beneath the teapot cover 4 to detect the temperature variation of the vapor inside the teapot thereby enabling the sensor 2 to detect the vapor temperature and convert the heat into electrical signal to be input into the electronic assembly 14. Therefore, when the teapot water reaches a certain predetermined temperature level near the sensor 2, the sensor, activates the speaker 12 to sound the musical alarm.

Figure 5:
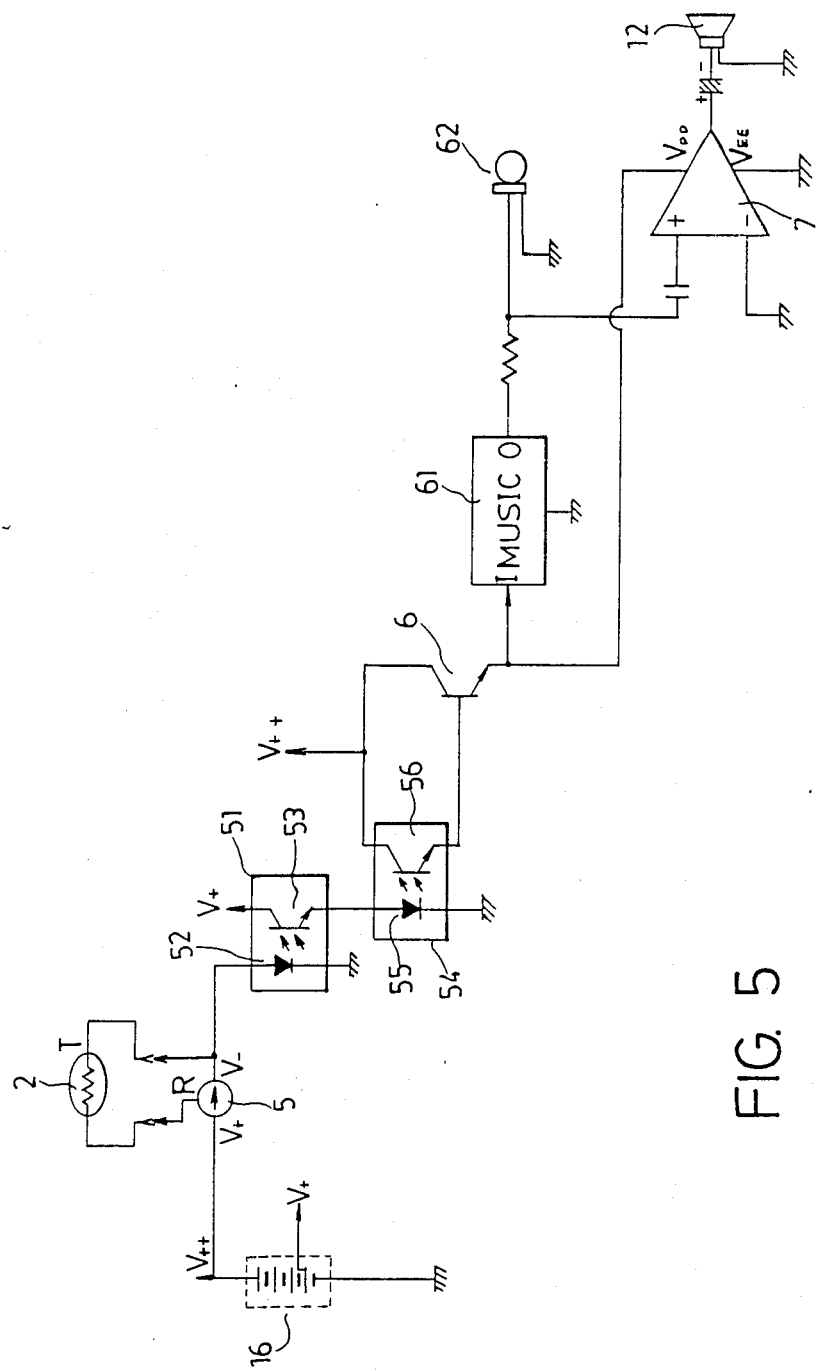
FIG. 5 is a circuit diagram of an electronic boiling point alarm in accordance with the present invention.

Now turning to FIG. 5, it can be seen the electronic circuit of this invention contains a sensor 2, a current source 5, two photocouplers 51 and 54, a transistor 6, a music-generating IC 61 and an amplifier 7. The voltages derived from the mercury cells 16 comprises a higher voltage V++ source which is connected through a current source 5 to a light-emitting diode 52 of the photocoupler 51. The current source is connected to the photocouplers 51, 54 and a base of said transistor 6. The output of the current source is inversely proportional to the resistance of the sensor 2, which is connected to the current source 5 and the resistance of the sensor 2 is inversely proportional to the temperature conducted thereto, so that the output current of the current source 5 is directly proportional to the temperature sensed by the sensor 2. In other words, the resistance of the sensor 2 determines the output current of the current source 5.

The light intensity generated by the light-emitting diode 52 determines the conduction level of an phototransistor 53 which in turn determines the light intensity of a light emitting diode 55 in the photocoupler 54. Similarly, the conduction level of a phototransistor 56, whose emitter is connected to the base of a transistor 6, is determined by the light intensity of the light emitting diode 55, which then determines the conduction level of the transistor 6.

The emitter of transistor 6 is connected to a trigger input of a music IC 61 and the power input of an amplifier 7. The output of music IC 61 is connected to the non-inverting input of the amplifier 7 and the output of the amplifier being connected to and driving a speaker 12. A capacitive microphone 62 is connected to the music IC 61 and amplifier 7 through a resistor and a capacitor, respectively.

When the teapot water temperature and hence the vapor temperature inside the teapot reaches a certain level, the current in the current source is high enough to drive the transistor 6, through the photocouplers 51 and 54, to have a sufficiently low resistance to, trigger the musical IC to deliver output to be amplified by the amplifier 7 and finally be emitted by the speaker 12 to sound the musical alarm. The resistance of the transistor 6 also determines the power input of the amplifier 7, so that when the vapor temperature further increases, the sound produced by the speaker will become louder and finally it becomes the loudest as the vapor temperature reaches the boiling point. Therefore, the user can know the status of the water in the teapot. The capacitive microphone 62 is used to convert the musical sound into electrical signal and then feed it back into the amplifier 7, thereby increasing the volume of the sound produced by the speaker 12.

A major advantage of this invention can be seen by sensing vapor temperature instead of sensing water temperature: When the water has reached the boiling point and the heating source is turned off, the steam inside the teapot beings to dissipate and the vapor temperature starts to drop quickly. Therefore, the speaker will cease to alarm soon after the heating source is turned off while the teapot water is still near its boiling point.

Two photo-couplers 51, 54 are used to reduce the static power loss to the minimum. When the light emitting diode 52 receives the minimum current from the current source 5, the photo-transistor 53 still has some current flowing therethrough. If the transistor 53 were connected directly to the V++ source, it would consume more power. Therefore, two photo-couplers 51, 54 are used so that when the photo-transistor 52 and light emitting diode 55 are conducted slightly, it is not sufficient to activate the transistor 56, thereby reducing the power loss.

I claim:

1. An electronic boiling point musical alarm comprising a body member (1), an upper plate (8), a sensor (2), a speaker (12) and an electronic assembly (14), a cavity (81) being formed within said upper plate (8) with said speaker (12) facing said cavity (81), a frusta-conical channel (11) being provided in said body member (1) forming a passage for the voice of said speaker (12) to propagate through and preventing said speaker (12) from possible damage caused by accumulation of vapor, an encasement (13) being provided for encasing said electronic assembly (14);

said sensor (2) being disposed within an inner hole (31) of a threaded portion of a sensing plate (32), a head (21) of said sensor (2) being received in a receptacle (15) at said encasement (13);

said electronic boiling point musical alarm being further characterized in that said sensor (2) detects vapor temperature variations of a teapot or the like thereby activating said speaker (12) to sound when said water temperature reaches a certain predetermined level.

2. The electronic boiling point musical alarm of claim 1, wherein said electronic assembly (14) comprises a current source (5), two photocouplers (51, 54), a transistor (6), a musical-generating IC (61), a capacitive microphone (62) and an amplifier (7), said sensor (2) being connected to said current source (5) so that a resistance of said sensor (2) determines an output current of said current source (5), said current source (5) being connected through said photocouplers (51, 54) to the base of said transistor (6), said capacitive microphone (62) being connected to said musical-generating IC (61) and said amplifier (7) for converting a musical sound into an electrical signal and feeding the electrical signal back into said amplifier thereby increasing the volume of the sound produced by said speaker (12), an emitter of said transistor (6) being connected to a trigger input of said musical-generating IC (61) and a power input of said amplifier (7), an output of said musical-generating IC (61) being connected to said amplifier (7), and an output of said amplifier (7) being connected to and driving said speaker (12).

* * * * *